(12) United States Patent
Andersson et al.

(10) Patent No.: US 10,150,166 B2
(45) Date of Patent: Dec. 11, 2018

(54) METHOD, SYSTEM, COMPUTER PROGRAMME AND A COMPUTER PROGRAMME PRODUCT FOR WORKING OF A WORK PIECE

(71) Applicant: Novator AB, Spånga (SE)

(72) Inventors: Hans-Petter Andersson, Saltsjöbaden (SE); Björn Pettersson, Järfälla (SE)

(73) Assignee: NOVATOR AB, Spanga (SE)

( * ) Notice: Subject to any disclaimer, the term of this patent is extended or adjusted under 35 U.S.C. 154(b) by 82 days.

(21) Appl. No.: 15/301,455

(22) PCT Filed: Jan. 29, 2015

(86) PCT No.: PCT/SE2015/050098
§ 371 (c)(1),
(2) Date: Oct. 3, 2016

(87) PCT Pub. No.: WO2015/183149
PCT Pub. Date: Dec. 3, 2015

(65) Prior Publication Data
US 2017/0106452 A1 Apr. 20, 2017

(30) Foreign Application Priority Data
May 26, 2014 (SE) ...................................... 1450623

(51) Int. Cl.
*G06F 19/00* (2018.01)
*B23B 49/02* (2006.01)
(Continued)

(52) U.S. Cl.
CPC .............. *B23B 49/02* (2013.01); *B23B 35/00* (2013.01); *B23B 37/00* (2013.01); *B23B 49/00* (2013.01);
(Continued)

(58) Field of Classification Search
CPC combination set(s) only.
See application file for complete search history.

(56) References Cited

U.S. PATENT DOCUMENTS 3,463,036 A     8/1969    O'Connor
5,181,809 A *   1/1993    Martin ............... G05B 19/4015
                                                                                             33/503

(Continued)

FOREIGN PATENT DOCUMENTS

CN           1077774 A      10/1993
CN        101821472 A       9/2010

(Continued)

OTHER PUBLICATIONS

European Search Report issued in European application No. 15799945.9 dated Dec. 11, 2017; 7 pages.

(Continued)

*Primary Examiner* — Kidest Bahta
(74) *Attorney, Agent, or Firm* — Pearne & Gordon LLP (57) ABSTRACT

The present invention relates to a method for working of a work piece, comprising the step of a) providing a template (1) with at least one opening (4, 6, 8, . . . 32) to the work piece (2), b) providing a work tool (70) at the opening (4, 6, 8, . . . 32), c) determining a distance (a) between a fixed reference (17, 116) for the tool (70) and a surface (118) of the work piece (2) facing the template (1), d) collecting the determined distance (a) into a memory (126), e) vibrating a rotary cutting tool (68) on the work tool (70) by means of a vibrating means (77); and f) working the work piece (2) based on said collected distance (a). The present invention also relates to a system for working and measuring objects comprising a computer (128) including a computer program (P) for carrying out the method. The present invention also (Continued)

relates to a computer program (P) and a computer program product for performing the method steps.

20 Claims, 8 Drawing Sheets

(51) Int. Cl.
    *B23B 49/00*     (2006.01)
    *G01B 5/20*     (2006.01)
    *B23B 35/00*     (2006.01)
    *B23B 37/00*     (2006.01)
    *B23C 3/00*     (2006.01)
    *B23Q 17/22*     (2006.01)
    *G01B 21/16*     (2006.01)

(52) U.S. Cl.
    CPC ............ *B23C 3/00* (2013.01); *B23Q 17/2233* (2013.01); *G01B 5/20* (2013.01); *B23B 2215/04* (2013.01); *B23B 2260/108* (2013.01); *B23B 2270/36* (2013.01); *B23C 2215/04* (2013.01); *B23C 2220/52* (2013.01); *G01B 21/16* (2013.01)

(56) References Cited

U.S. PATENT DOCUMENTS

| | | | |
|---|---|---|---|
| 5,348,431 A * | 9/1994 | Kusunoki | B23Q 1/38 409/132 |
| 2006/0013662 A1 | 1/2006 | Faul et al. | |
| 2007/0082464 A1 * | 4/2007 | Schatz | H01L 21/67173 438/458 |
| 2011/0066824 A1 | 3/2011 | Bestler | |
| 2011/0166824 A1 | 7/2011 | Haisty et al. | |

FOREIGN PATENT DOCUMENTS

| | | |
|---|---|---|
| CN | 202003193 U | 10/2011 |
| DE | 202008003538 U1 | 8/2008 |
| DE | 102010016561 A1 | 10/2011 |
| EP | 0482983 B1 | 4/1995 |
| EP | 1102653 B1 | 5/2001 |
| EP | 1314500 A2 | 5/2003 |
| EP | 1514625 A1 | 3/2005 |
| EP | 1314500 A3 | 2/2006 |
| EP | 2591870 A1 | 5/2013 |
| GB | 2136129 A | 9/1984 |
| JP | H04310353 A | 11/1992 |
| JP | H10207520 A | 8/1998 |
| JP | H10286708 A | 10/1998 |
| JP | 2008502496 A | 1/2008 |
| JP | 201216793 A | 1/2012 |
| JP | 2013527808 A | 7/2013 |
| WO | 9411142 A1 | 5/1994 |
| WO | 2005120752 A1 | 12/2005 |
| WO | 2010064985 A1 | 6/2010 |
| WO | 2011137171 A1 | 11/2011 |

OTHER PUBLICATIONS

International Search Report and Written Opinion issued in PCT/SE2015/050098 dated Aug. 28, 2015, 9 pages.

Chinese Office Action and Search Report issued in Chinese application No. 2015800249750 dated Apr. 18, 2018; English translation included.

Japanese Notice of Reasons for Refusal issued in application No. 2016-568923 dated Aug. 28, 2018; 9 pages.

* cited by examiner

METHOD, SYSTEM, COMPUTER PROGRAMME AND A COMPUTER PROGRAMME PRODUCT FOR WORKING OF A WORK PIECE

TECHNICAL FIELD

The present invention relates to a method for working of a work piece and a system for working and measuring objects comprising a computer including a computer program for carrying out the method. The present invention also relates to a computer programme and a computer programme product for performing the method steps.

BACKGROUND ART

A reliable and repeatable hole quality is essential, especially in drilling applications using templates. The hole quality depends on the measurement methods, type of hole making apparatus, tool wear and type of material in which the hole is produced.

When the work piece is a stack of sheets of different materials the hole quality depends on how the hole is produced in the different materials and the material characteristics of each sheet in the stack.

When holes are produced in a work piece it is important to identify the orientation and location of the tool in relation to the work piece. When a template is arranged on the work piece the orientation of the tool in relation to the work piece is given, but for example when producing a hole provided with a countersink the depth of the countersink is critical in order to achieve an interacting connection between a fastening element and the hole provided with the countersink.

When a number of holes of a predetermined accuracy are to be made, different methods and systems are known for identifying each individual hole, collecting and registration information about the work piece and the tool when the holes are produced in the work piece, and also for measuring the holes after they have been produced in the work piece. Often such measuring methods are based on a sample of the produced holes and therefore some of the produced holes may not fulfil the high demands of accuracy.

Measuring devices and methods for measuring the position of a tool in relation to a work piece are known. Document U.S. Pat. No. 5,181,809 discloses a device and a system enabling a tool to be brought to a precise location of a drilling template. However, the device is not arranged to measure the distance between the work piece and the drilling template and therefore this device is not suitable when producing holes provided with for example a countersink.

Different types of hole making apparatuses are available. For special applications such as hole making in the aircraft structure of an aircraft the demands of accuracy are extremely high and therefore special hole making apparatuses should preferably be provided. Such a special hole making apparatus may use the orbital drilling technique. Orbital drilling is based on machining the material both axially and radially by rotating the cutting tool about its own axis as well as eccentrically about a principal axis while feeding the cutting tool through the material. The general principles in orbital drilling are for instance disclosed in U.S. Pat. No. 5,641,252 and EP-B1-1102653. Other types of hole making apparatuses for making holes of extremely high accuracy are also possible to use.

SUMMARY OF THE INVENTION

Notwithstanding the existence of such prior art devices and methods described above, there is a need to produce holes with high accuracy in a work piece. There is also a need to methodize and systemize collecting and registering of information about the work piece, the tools and the produced holes during the hole making operation.

An objective problem to be solved by the present invention is to produce holes with high accuracy and with correct hole shape within narrow tolerances in a work piece.

Another problem to be solved by the present invention is to produce holes with a high production rate in a work piece.

A further objective problem to be solved by the present invention is to systemize a hole making operation when producing a number of holes in a work piece.

A still further objective problem to be solved by the present invention is therefore to methodize and systemize collection and registration of information about each individual hole among a number of holes when producing the holes in the work piece.

These objects above are achieved by a method for measuring objects according to claim 1, a system for measuring and working objects according to claim 17, a computer program comprising a programme code according to claim 18, a computer program product comprising program code stored on a media according to claim 19, and a computer program product directly storable in an internal memory into a computer according to claim 20.

The present invention relates to a method for working of a work piece, comprising the following step: providing a template with at least one opening to a work piece. The method of the present invention is characterized in that it further comprises the steps of:

provi ding a work tool in the opening,
determining the distance between a fixed reference for the work tool and a surface of the work piece facing the template,
collecting the determined distance into a memory,
vibrating a rotary cutting tool on the work tool by means of a vibrating means, and
working the work piece based on said collected distance.

According to the solution of the present invention, it was realized that the holes can be produced with high accuracy and with correct hole shape within narrow tolerances at high production rate. According to the solution of the present invention, it was also realized that a cooling effect of both the cutting tool and the work piece were achieved.

According to a further embodiment of the present invention the fixed reference for the work tool is situated on a first distal end of the rotary cutting tool.

According to this further embodiment, it was realized that it is easy to determine the distance between the fixed reference and a surface of the work piece facing the template in order to produce holes with high accuracy and with correct hole shape within narrow tolerances at high production rate.

According to a further embodiment of the present invention the determined distance is the difference between the length of the rotary cutting tool and the length of a collet enclosing at least partly the rotary cutting tool.

According to this further embodiment, it was realized that it is easy to determine the distance between the fixed reference and a surface of the work piece facing the template by determining the difference between the length of the rotary cutting tool and the length of a collet enclosing at least partly the rotary cutting tool.

According to a further embodiment of the present invention the at least one opening comprises a bushing and the method comprises the steps of:

identifying the bushing;
determining the distance a between a fixed reference for the work tool and a surface of the work piece facing the template and identify a fixed point on the identified bushing as the fixed reference for the work tool;
collecting the determined distance into a memory, identifying the bushing;
providing a work tool on the identified bushing;
bringing the determined distance for the identified bushing from the memory;
vibrating a rotary cutting tool on the work tool by means of a vibrating means; and
working the work piece based on said collected distance.

According to the solution of the present invention, it was realized that the holes can be produced with high accuracy and with correct hole shape within narrow tolerances at high production rate. According to the solution of the present invention, it was realized that a cooling effect of both the cutting tool and the work piece were achieved.

According to a further embodiment of the present invention the method comprises working of the work piece when the work piece is a stack of sheets of different materials, whereby the method further comprises the steps of:
bringing information from the memory regarding material characteristics and thickness of each sheet in the stack, and number of sheets in the stack.

According to this further embodiment, it was realized that the holes can be produced with high accuracy and with correct hole shape within narrow tolerances at a high production rate in a work piece of sheets of different materials.

According to a further embodiment of the present invention the method comprises the further step of vibrating the work tool only in selected sheets of the stack.

According to this further embodiment, it was realized that the holes can be produced with high accuracy and with correct hole shape within narrow tolerances at a high production rate in a work piece of sheets of different materials.

According to a further embodiment of the present invention the method comprises the further step of collecting data from the working operation into the memory.

According to this further embodiment, it was realized that when methodizing and systemizing the collection and registration of information about each individual hole among a number of holes, the holes can be produced with high accuracy and with correct hole shape within narrow tolerances at a high production rate.

According to a further embodiment of the present invention the method comprises the further steps of:
identifying the opening;
measuring the work piece with respect to the result of the working operation;
collecting the measured values into the memory.

According to this further embodiment, it was realized that the collected measured values stored into the memory may be used for documentary reasons. When drilling a large number of holes into for example an aircraft structure it is important to collect and store information about the characteristics of each hole drilled in the structure and also to have the possibility to identify each individual hole in the structure.

According to this further embodiment, it was also realized that the collected information of the working operation may be used for matching the worked work piece with different components, such as fastening elements.

The present invention also relates to a computer programme and a computer programme product for performing the method steps according to the present invention.

By the term "hole" is meant forming of an opening or recess in the material by the working process that results in a hole configuration or geometry. Thus, the hole is not limited to a circular hole but can be of any shape, such as triangular, polygonal shaped or a counter sink hole. The hole can be a through hole or a blind hole. Hence, by the term hole "diameter" is meant any distance straight across the opening that forms the hole and not only the largest opened distance cross the hole.

BRIEF DESCRIPTION OF THE DRAWINGS

The invention will hereinafter be described with reference to embodiments of the invention and the enclosed figures, where.

DETAILED DESCRIPTION

The method for working of a work piece and the system for working and measuring objects comprising a computer including a computer program for carrying out the method according to an embodiment of the present invention will now be described by way of example only. The disclosure is not intended to limit the scope of the enclosed claims in any way.

Figure 1:
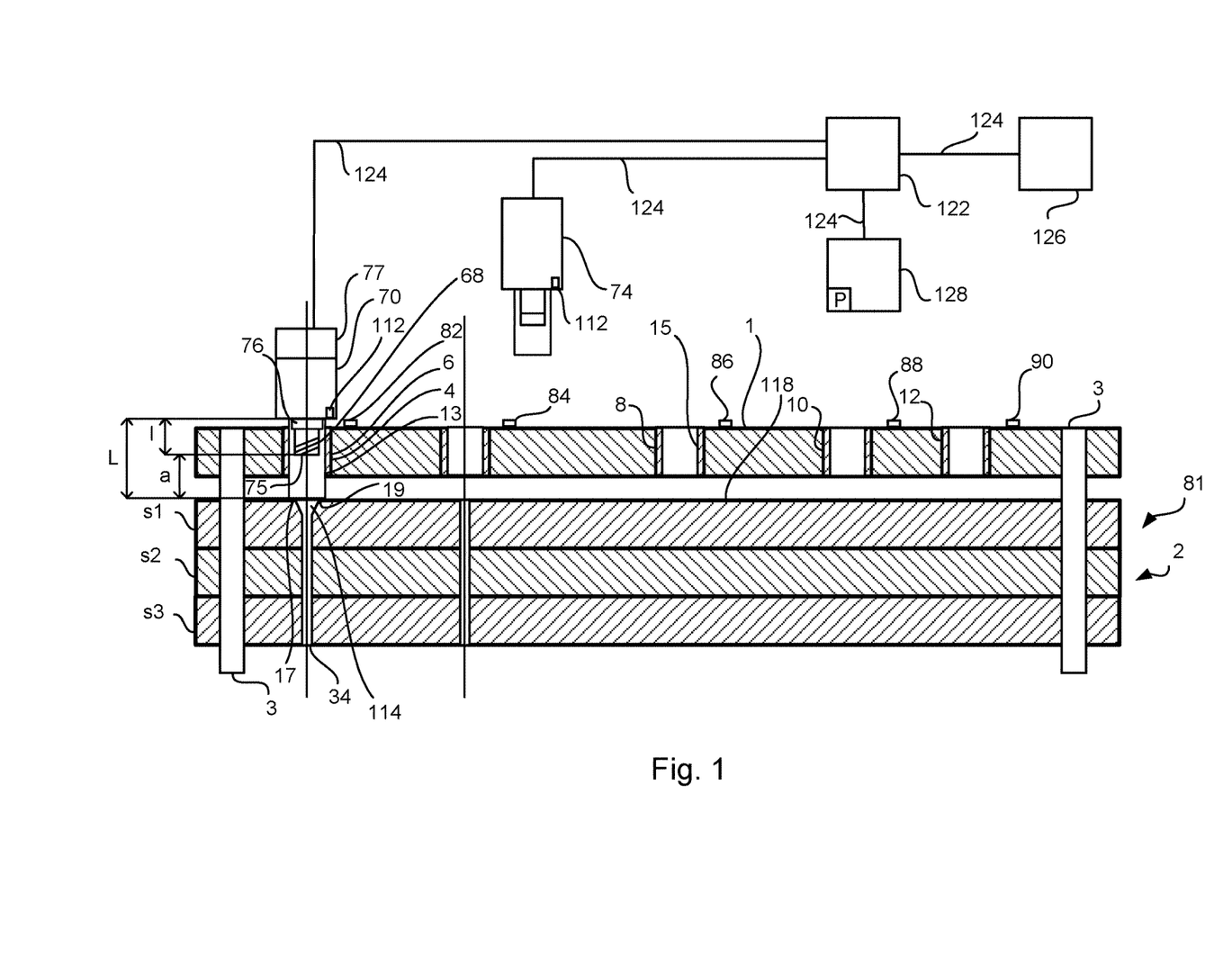
FIG. 1 shows a section view of a template connected to a work piece according to a first embodiment of the invention.

FIG. 1 shows a section view of a template connected to an object, such as a work piece according to a first embodiment of the invention. The template 1 is provided with a plurality of openings 4, 6, 8, . . . 12 located in a pattern corresponding to the positions of holes 12 to be formed in the work piece 2 to which the template 1 is attached. The openings 4, 6, 8, . . . 12 are adapted for the fixation of the work tool such as a drilling machine 70 and also a measuring instrument 74 to the template 1. A collet 13 is arranged on the drilling machine 70 and enclosing at least partly the rotary cutting tool 68. The collet 13 is substantially cylindrical and concentric with the rotary cutting tool 68 and has a conical shape in order to be attached into the openings 4, 6, 8, . . . 12. A corresponding sleeve 15 may be arranged in each opening 4, 6, 8, . . . 12 to accommodate the collet 13. Alternatively, the collet 13 may be arranged to expand within the opening 4, 6, 8, . . . 12 and in the expanded state the drilling machine 70 is attached to the template 1. In order to know how deep the cutting tool 68 should be fed into the work piece 2 when making the hole 34 the distance a between a fixed reference 17 for the work tool 70 and a surface 118 of the work piece 2 facing the template 1 must be determined. The fixed reference 17 for the work tool 70 is preferably situated on a first distal end 75 of the rotary cutting tool 68. The distance a is the difference between the length l of the rotary cutting tool 68 and the length L of the collet 13. When the drilling machine 70 is attached to the template 1 a second distal end 19 of the collet 13 is arranged to rest against the surface 118 of the work piece 2. Also, the distance a may according to the first embodiment be measured by means of a hand held measuring instrument, such as a sliding caliper (not disclosed).

Figure 2:
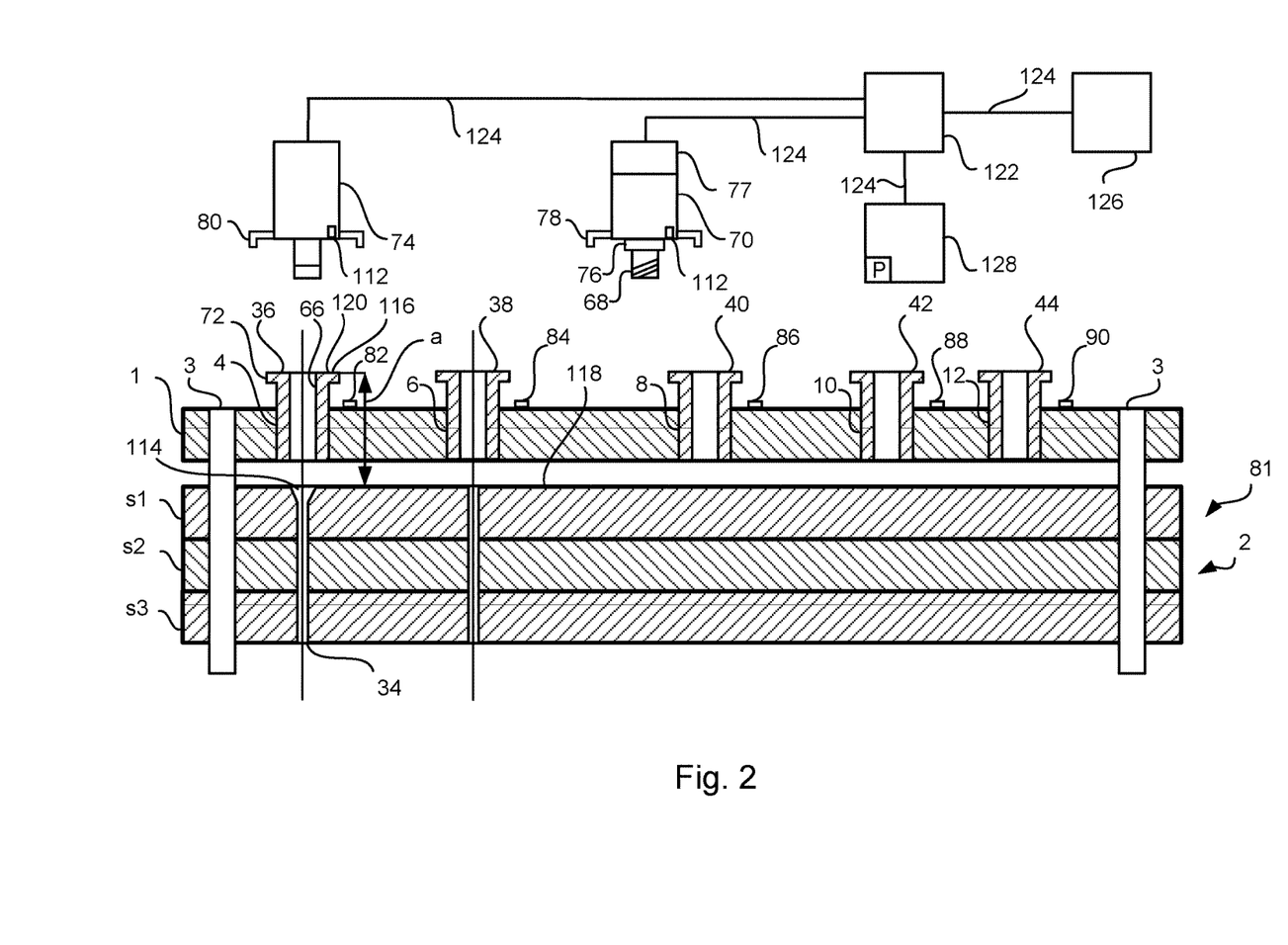
FIG. 2 shows a section view of a template connected to a work piece according to a second embodiment of the invention.

The drilling machine 70 has a drill chuck 76 for holding the rotary cutting tool 68, a vibration means 77 for vibrating the cutting tool 68 and a suitable fixation device 78 for fixating the machine 70 to the openings 4, 6, 8, . . . 12 in the template 1. Also, the measuring instrument 74 has a suitable fixation arrangement 80 for fixating the instrument 74 to the openings 4, 6, 8, . . . 12 in the template 1. The work piece 2 may consist of a stack 81 of sheets s1, s2, s3 of different materials, such as fibre-reinforced composite materials, laminates, metals and stacks of identical or various materials, etc. In FIG. 2 the work piece 2 consist of a stack 81 of three sheets s1, s2, s3, wherein each sheet s1, s2, s3 has a thickness and specific material characteristics. In order to produce holes 34 of various configurations and dimensions therein with help of one and the same cutting tool 68 use of a portable drilling machine 70 is preferred. As many holes 34 of various size and configurations are to be formed in a rapid sequence, the operator may have difficulties in identifying the openings 4, 6, 8, . . . 12 in which the machine 70 is fixated, and establishing which specific hole-cutting processing data should be applied by the drilling machine 70 to the opening 4, 6, 8, . . . 12 in question.

According to the invention a unique, individual marking or information carrier 82, 84, 86, . . . 110 containing an identification of the hole 34 to be formed is affixed adjacent to each opening 4, 6, 8, . . . 12 on the template 1. The markings or information carriers 82-110 may consist of any suitable type of readable ID, such as a RFID tag or chip, a bar code, a colour marking, etc., and can be identified by a reader or sensor 112 on the measuring instrument 74 and on the drilling machine 70. Alternatively, each bushing 36-64 may be identified by means of a local orientation system in three dimensions where the position of the openings 4, 6, 8, . . . 12 may be identified in relation to a number of transmitters (not disclosed) and/or reference points located adjacent to or in the vicinity of the template 1.

The vibrating means 77 is arranged to vibrate the cutting tool 68 in the longitudinal direction when making the hole 34. The cutting tool 68 also rotates when it vibrates. The vibrations create shorter flakes and contribute to lower the temperature of the cutting tool 68 and of the work piece 2 during the hole making process. However, depending on the material in the work piece 2 it is more or less suitable to vibrate the cutting tool 68. Therefore, when making holes 34 in a stack of sheets of different materials the vibrating means 77 must be switched on and of depending on which sheet s1, s2, s3 in the stack 81 the cutting tool 68 is situated when making the hole 34.

When producing holes 34 in a stack 81 of sheets s1, s2, s3 of different materials information about the depth of the cutting tool 68 in the work piece 2 is critical in order to know when the cutting tool 68 is situated in each of the sheet s1, s2, s3 during the cutting process. Therefore, a distance a between a fixed reference (116, . . . ) for the tool (70) situated on a collet enclosing at least partly the rotary cutting tool (68) and a surface 118 of the work piece 2 facing the template 1 must be determined in order to know when the cutting tool 68 hits the surface of the sheet s1 facing the template 1. Also, when knowing the thickness of each sheet s1, s2, s3 it can be decided how deep the cutting tool 68 should be feeded into the work piece 2 with the vibrator means activated or deactivated when making the hole 34. The frequency and amplitude of the vibrations, and also the rotating velocity and feeding rate of the cutting tool 68 depend on the material characteristics of the work piece 2. The vibrating means 77 is preferably switched on when the cutting tool 68 reaches a sheet s1, s2, s3 in the stack 81, which consists of a material, such as titan or aluminum, wherein the flakes during the hole making process will be shorter and the cooling effect of both the cutting tool 68 and the work piece 2 increases. However, before the cutting tool 68 leaves the sheet s1, s2, s3 and reaches the surface of the sheet s1, s2, s3 wherein the outgoing hole of the sheet s1, s2, s3 will be situated the vibrating means 77 is preferably switched off. As a result a hole with high accuracy and with a correct hole shape will be achieved and the surface of the sheet s1, s2, s3 will not be negative affected. When the cutting tool 68 reaches a sheet s1, s2, s3 in the stack 81, which consists of another type of material, such as fibre-reinforced composite materials the vibrating means 77 is preferably switched off because the vibrations may have an influence on the accuracy of the hole shape.

The drilling machine 70, the vibrating means 77 and the measuring instrument 74 are connected to a control unit 122 by means of electrical wires 124. Also, a memory 126 is connected to the control unit 122 by means of electrical wires 124. The control unit 122 and the memory 126 may be installed into the drilling machine 70 or as separate units outside the drilling machine 70 and the measuring instrument 74. The drilling machine 70 and the measuring instrument 74 may also communicate wireless with the control unit 122 and the memory 126.

The drilling is controlled by a control unit 122. The control unit 122 receives information from the memory 126 about a receipt containing for example collected tool and material parameters, whereby the control unit 122 uses the information for running the drilling operation. The control unit 122 is preferably run by a computer 128, having a software algorithm adapted for providing calculations.

When attaching the drilling machine 70 to one of the openings 4, 6, 8, . . . 12 on the template 1, the sensor 112 will detect the hole identity of the adjacent information carrier 82-110 and transmit it to the memory 126 containing all relevant information of the respective hole 34 to be formed, such as type of hole 34, various processing and dimensional parameters thereof, e.g. diameter, depth and configuration of the hole 34, cutting advancement speed, shape of countersinks 114, etc. Also, information about number of sheets s1, s2, s3 in the stack 81, material characteristics of the material in each of the sheets s1, s2, s3 and the thickness of each sheet s1, s2, s3 are transmitted. Then, the control unit 122 is adapted to control the machine 70 to carry out the relevant hole cutting process in the work piece 2 and switch on and off the vibrating means 77 depending on information transmitted to and from the control unit 122. Thus, the operator may only have to fixate the drilling machine 72 on the bushing 36-64 and to activate it to initiate the relevant hole-cutting process.

After the production of all holes 34 in the work piece 2 a control measurement thereof may be performed by means of the measuring instrument 74 to establish any discrepancies from the predetermined parameters requiring renewed treatment of the hole in question or to match the hole 34 with a suitable fastening element having dimensions adapted to the hole 34. The drilling machine 70, the measuring instrument 74, the control unit 122, the computer 128 and the memory 126 may be connected to a local network. Measurement results of the drilled holes 34 are stored in the memory 126. The data from the memory 126 may then be used for checking whether the holes 34 in the work piece 2 have been drilled in a correct sequence, at the right time, with the correct parameters, by a correct cutting tool 68, etc.

Figure 3:
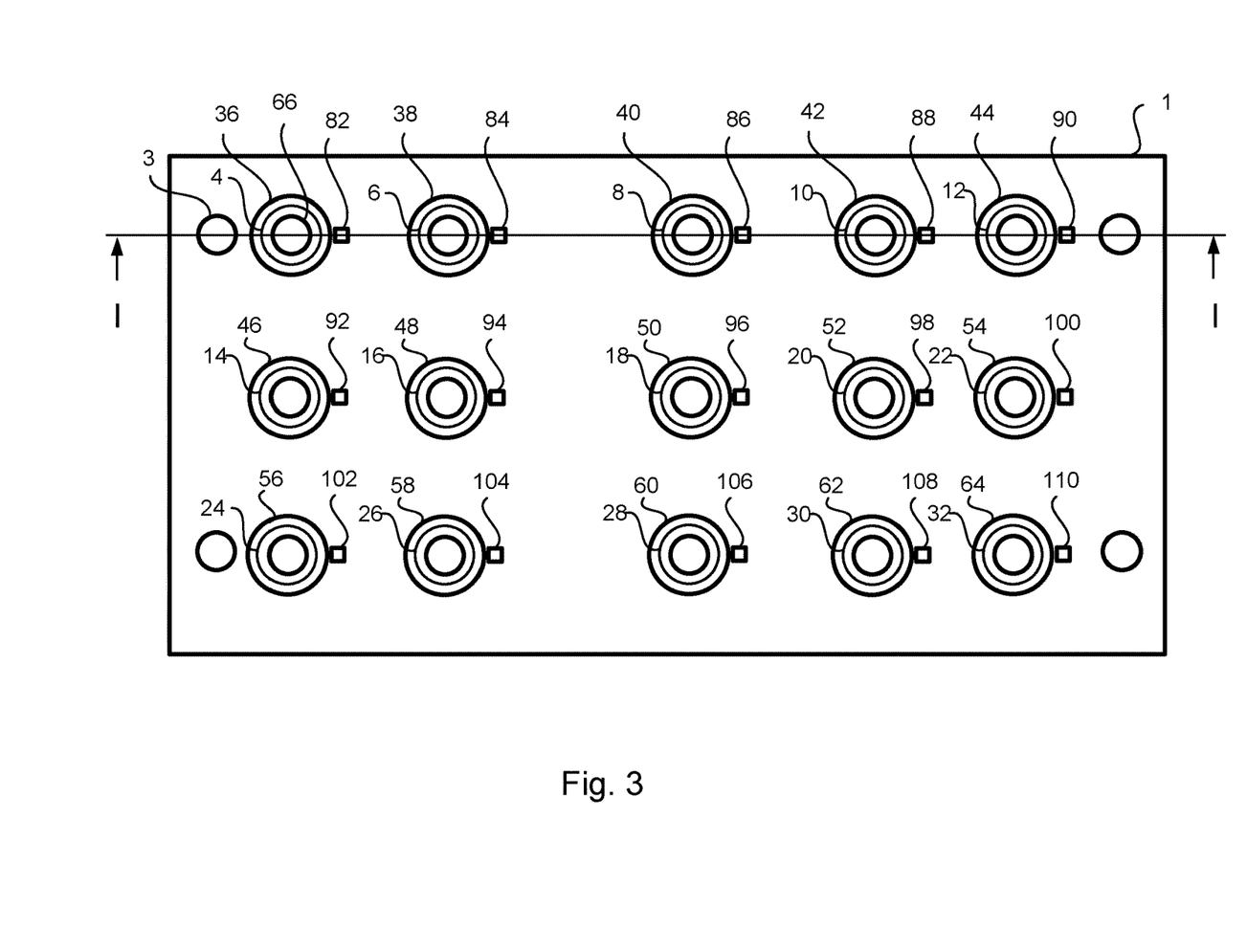
FIG. 3 shows a plane view of the template in FIG. 2.

FIGS. 2 and 3 show a section view and a plane view, respective of a template 1 connected to a work piece 2, by means of connecting elements 3 according to a second embodiment of the invention. FIG. 2 represents the section view along line I-I in FIG. 2. The openings 4, 6, 8, . . . 32 are located in a pattern in the template 1 corresponding to the positions of holes 34 to be formed in the work piece 2 to which the template 1 is attached. Guide bushings 36, 38, 40, . . . 64 are inserted in the openings 4-32 of the template 1 to form guide holes 66 for a rotary cutting tool 68. The bushings 36-64 are provided with a flange 72 for the fixation of the work tool such as a drilling machine 70 and also a measuring instrument 74 to the template 1.

The drilling machine 70 has a drill chuck 76 for holding the rotary cutting tool 68, a vibration means 77 for vibrating the cutting tool 68 and a suitable fixation device 78 for fixating the machine 70 to the bushings 36-64 of the template 1. Also, the measuring instrument 74 has a suitable fixation arrangement 80 for fixating the instrument 74 to the bushings 36-64 of the template 1. The work piece 2 may consist of a stack 81 of sheets s1, s2, s3 of different materials, such as fibre-reinforced composite materials, laminates, metals and stacks of identical or various materials, etc. In FIG. 2 the work piece 2 consist of a stack 81 of three sheets s1, s2, s3, wherein each sheet s1, s2, s3 has a thickness and specific material characteristics.

An individual marking or information carrier 82, 84, 86, . . . 110 containing an identification of the hole 34 to be formed is affixed adjacent to each bushing 36-64 on the template 1.

The measuring instrument 74 is provided on the identified bushing 36-64 for measuring the distance a between the fixed point 116 on the identified bushing 36-64 and the surface 118 of the work piece 2 facing the template. Preferably, the fixed point 116 on the identified bushing 36-64 coincide with a surface 120 on the bushing 36-64 which facing away from said surface 118 of the work piece 2. The measuring instrument 74 is adapted to be connected to the flange 72 of the bushings 36-64. Also, when producing holes 34 provided with a countersink 114 the depth of the countersink 114 in the work piece 2 is critical in order to achieve an interacting connection between a fastener element (not disclosed) and the hole 34 provided with the countersink 114. Therefore, the distance a must be determined in order to know how deep the cutting tool 68 should be feeded into the work piece 2 when making the hole 34.

The drilling machine 70, the vibrating means 77 and the measuring instrument 74 are connected to the control unit 122. Also, a memory 126 is connected to the control unit 122. The control unit 122 and the memory 126 may be installed into the drilling machine 70 or as separate units outside the drilling machine 70 and the measuring instrument 74.

When attaching the drilling machine 70 to one of the bushings 36-64 on the template 1, the sensor 112 will detect the hole identity of the adjacent information carrier 82-110 and transmit it to the memory 126 containing all relevant information of the respective hole 34 to be formed, such as type of hole 34, various processing and dimensional parameters thereof, e.g. diameter, depth and configuration of the hole 34, cutting advancement speed, shape of countersinks 114, etc. Also, information about number of sheets s1, s2, s3 in the stack 81, material characteristics of the material in each of the sheets s1, s2, s3 and the thickness of each sheet s1, s2, s3 are transmitted. Then, the control unit 122 is adapted to control the machine 70 to carry out the relevant hole cutting process in the work piece 2 and switch on and off the vibrating means 77 depending on information transmitted to and from the control unit 122. Thus, the operator may only have to fixate the drilling machine 72 on the bushing 36-64 and to activate it to initiate the relevant hole-cutting process.

Figure 4:
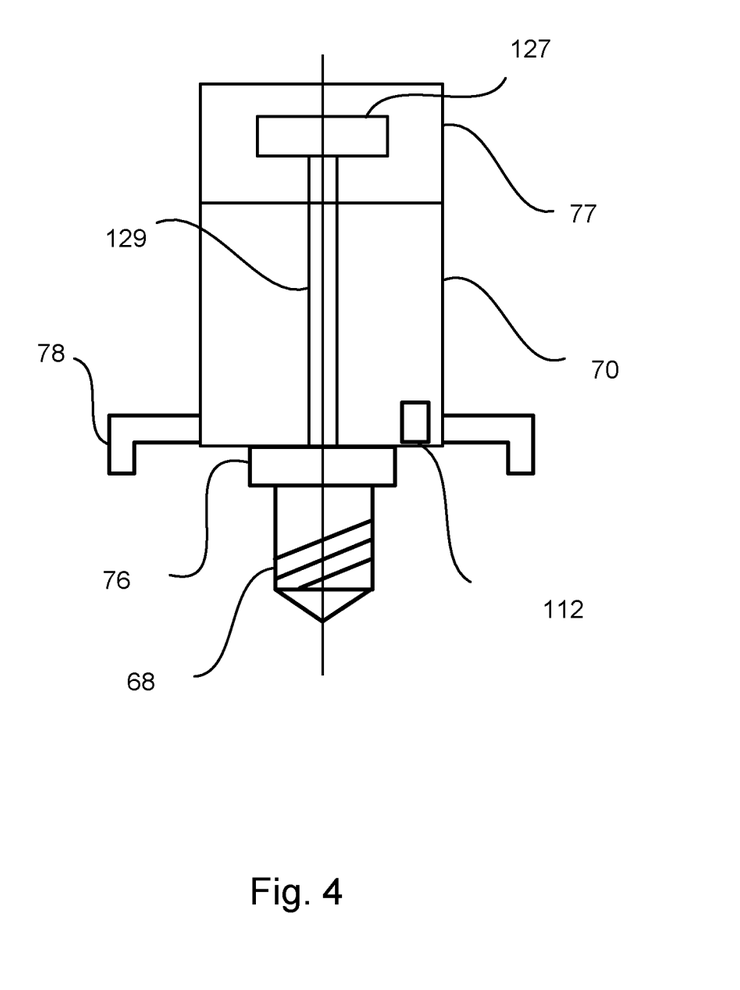
FIG. 4 shows a side view of a drilling machine provided with a vibrator means.

FIG. 4 shows a side view of the drilling machine 70 provided with a vibrating means 77 according to the second embodiment of the invention. The vibrating means 77 comprises a vibrating element 127 connected to the cutting tool 68 via a shaft 129 in the drilling machine 70. The vibrating means 77 may for example be made of a piezo electrical element or a mechanical rotating element which creates vibrations when it rotates. The drill chuck 76 for holding the rotary cutting tool 68, the fixation device 78 for fixating the machine 70 to the bushings 36-64 of the template 1 and the reader or sensor 112 for identifying the markings or information carriers 82-110 related to the bushings 36-64 of the template 1 are also disclosed in FIG. 4

The drilling machine 70 may be an orbital drilling apparatus which is characterized by a cutting tool diameter that is less than the diameter of the resulting hole 34; a tool cutting edge that is intermittently in contact with the hole edge; small chip formation; and a low thrust force.

Figure 5:
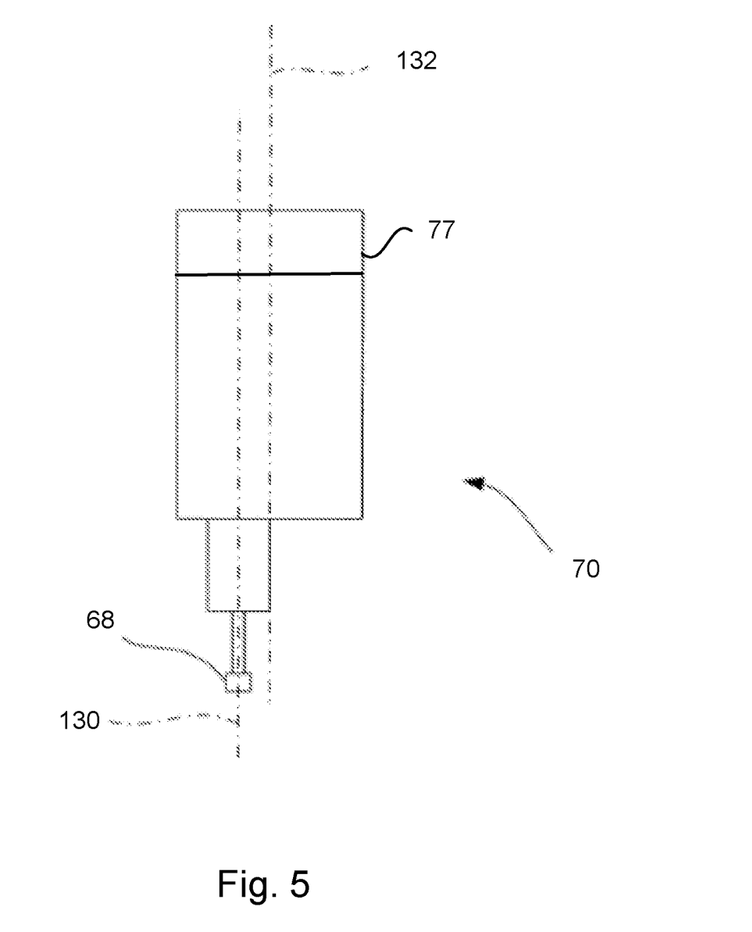
FIG. 5 shows a side view of an orbital drilling apparatus.

FIG. 5 shows a side view of the drilling machine 70 in form of an orbital drilling apparatus, comprising a cutting tool 68 for drilling a hole in a work piece 2. The cutting tool 68 has a cutting tool axis 130. The cutting tool 68 is rotated about its own axis 130 as well as eccentrically about a principal axis 132 of the orbital drilling apparatus. The orbital drilling apparatus is provided with a vibrating means 77 according to the invention and is arranged to vibrate the cutting tool 68 along the axis 130.

Figure 6:
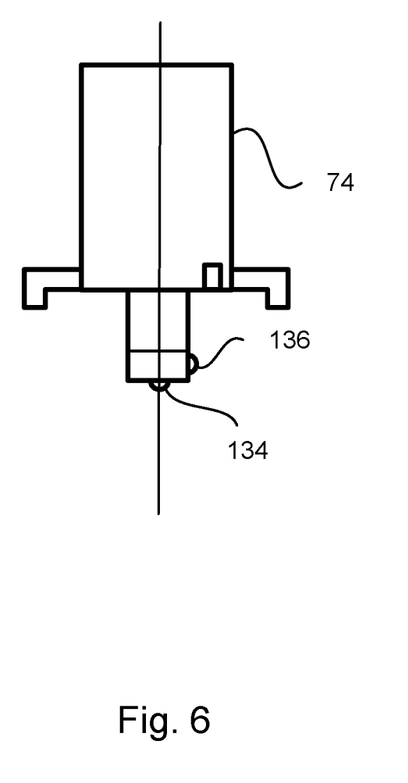
FIG. 6 shows a side view of a measuring instrument.

FIG. 6 shows a side view of the measuring instrument 74 according to the second embodiment of the invention. The measuring instrument 74 comprises a first and a second probe 134, 136 which are directed in different directions. When performing the measuring of the distance a, the first probe 134 is preferably directed towards the surface 118 of the work piece 2. When performing the measuring of the shape of the worked hole 34 the second probe 136 is preferably directed in a radial direction to the worked hole 34 in the work piece 2 or in an angel in relation to the radial direction to the worked hole 34 in the work piece 2. However, it is also possible to provide to different measuring instruments 74, one instrument comprising a first probe 134 directed towards the surface 118 of the work piece 2 and another instrument comprising a second probe 136 directed in a radial direction to the worked hole 34 in the work piece 2.

Figure 7:
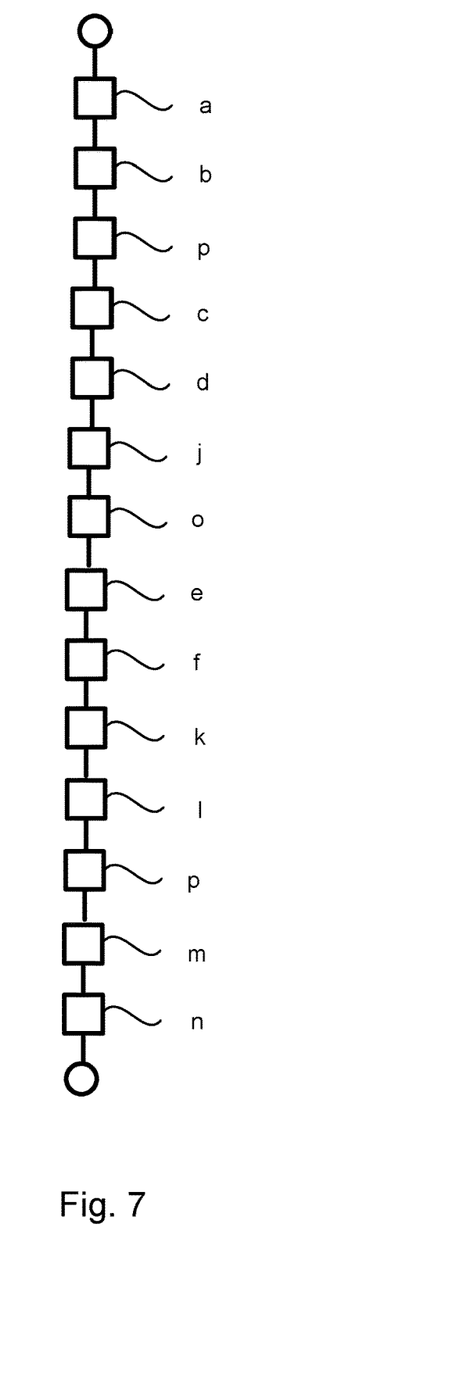
FIG. 7 illustrates a method according to the first embodiment of the invention in a block diagram.

In operation, the method according to the first embodiment of the invention is illustrated in a block diagram in FIG. 7.

The method according to the first embodiment comprising the step of:
a) providing a template 1 with at least one opening 4, 6, 8, . . . 32 to the work piece 2;
b) providing a work tool 70 at the opening 4, 6, 8, . . . 32;
c) determining a distance a between a fixed reference 17, 116 for the work tool 70 and a surface 118 of the work piece 2 facing the template 1;
d) determine the measured distance a into a memory 126,
e) vibrating a rotary cutting tool 68 on the work tool 70 by means of a vibrating means 77; and
f) working the work piece 2 based on said collected distance a.

Preferably, the fixed reference 17 for the work tool 70 is situated on a first distal end 75 of the rotary cutting tool 68. As a result it is easy to determine the distance between the fixed reference and a surface of the work piece facing the template in order to produce holes with high accuracy and with correct hole shape within narrow tolerances at high production rate.

Preferably, the determined distance a is the difference between the length l of the rotary cutting tool 68 and the length L of a collet 13 enclosing at least partly the rotary cutting tool 68. As a result it is easy to determine the distance between the fixed reference and a surface of the work piece facing the template by determining the difference between the length of the rotary cutting tool and the length of a collet enclosing at least partly the rotary cutting tool.

Figure 8:
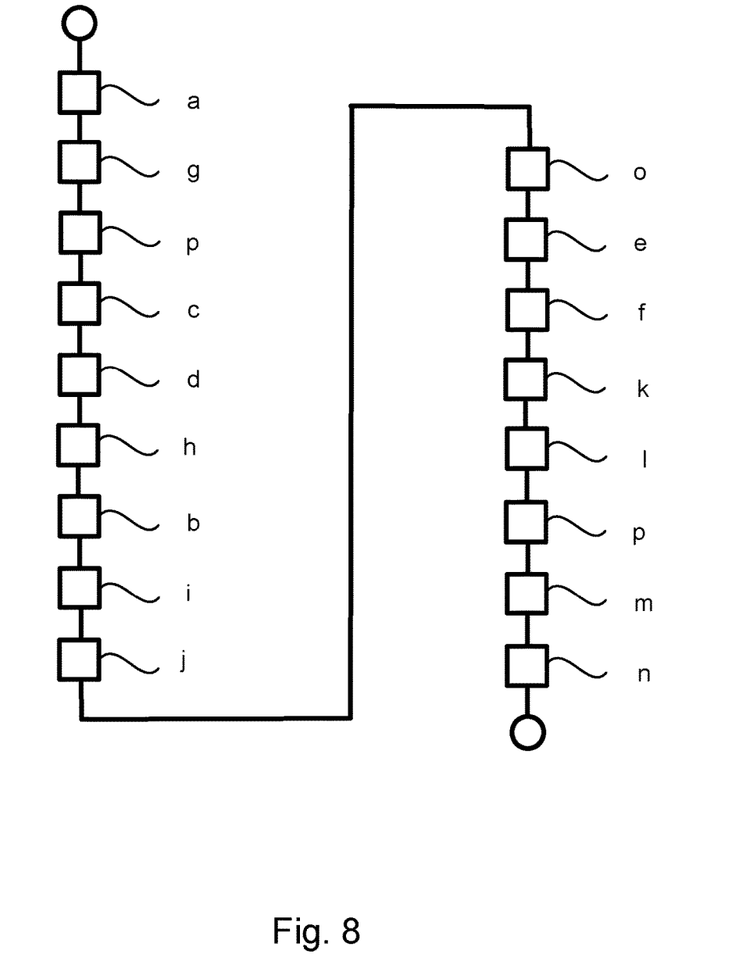
FIG. 8 illustrates a method according to the second embodiment of the invention in a block diagram.

In operation, the method according to the second embodiment of the invention is illustrated in a block diagram in FIG. 8.

In the second embodiment the at least one opening 4, 6, 8, . . . 32 comprises a bushing 36-64 and the method according to the second embodiment comprising the further steps of:

after step a): the further step of g) identifying the bushing 36-64;
performing step c) before step b) and identify a fixed point 116 on the identified bushing 36-64 as the fixed reference for the tool 70;
performing step d) after step c) and before step b);
after step d): the further step of h) identifying the bushing 36-64; and
after step b) and before step e): the further step of i) bringing the determined distance a for the identified bushing 36-64 from the memory 126.

As a result, the steps according to this second embodiment will follow the sequence:
identifying the bushing 36-64;
determining the distance a between a fixed reference 116 for the work tool 70 and a surface 118 of the work piece 2 facing the template 1 and identify a fixed point 116 on the identified bushing 36-64 as the fixed reference for the work tool 70;
collecting the determined distance a into a memory 126;
identifying the bushing 36-64;
providing a work tool 70 on the identified bushing 36-64;
bringing the determined distance for the identified bushing 36-64 from the memory 126;
vibrating a rotary cutting tool 68 on the work tool 70 by means of a vibrating means 77; and
working the work piece 2 based on said collected distance a.

The work piece 2 may be of any suitable material or a combination of materials arranged in a stack. Preferably, the fixed point 116 on the identified bushing 36-64 coincide with a surface 120 on the bushing 36-64 which facing away from said surface 118 of the work piece 2. Preferably, the bushing 36-64 is identified by means of a RFID tag arranged on the bushing 36-64 or on the template 2. However, the bushing 36-64 is identified by means of any suitable type of readable information carrier 82-110, such as a RFID tag or chip, a pin code, a colour marking, etc., and can be identified by a reader or sensor 112 of the drilling machine 70. Alternatively, each bushing 36-64 may be identified by means of a local positioning system (not disclosed). The cutting tool 68 also rotates when it vibrates. The vibrations create shorter flakes and contribute to lower the temperature of the cutting tool 68 and of the work piece 2 during the hole making process.

Because the distance a, between the fixed point 116 on the identified bushing 36-64 and a surface 118 of the work piece 2 facing the template 1 is known and collected into the memory 126 the work piece 2 may be worked with very narrow tolerances with regard to depth in the work piece 2 when for example drilling a hole 34 with a countersink 114. Preferably, the work tool 70 is connected to a control unit 122 and comprises an orbital cutting apparatus having an axis 130, the cutting tool 68 is rotated about its own axis 130 as well as eccentrically about a principal axis 132. However, the work tool 70 may be another type of tool, such as a conventional drilling tool. Preferably, the control unit 122 is run by a computer 128, having a software algorithm adapted for providing calculations about the working operation.

Preferably, the work piece 2 is a stack of sheets s1, s2, s3 of different materials and after step g) and before step h) the method further comprises the steps of:
j) bringing information from the memory 126 regarding material characteristics and thickness of each sheet s1, s2, s3 in the stack 81, and number of sheets s1, s2, s3 in the stack 81.

The method further comprises:
vibrating the work tool (70) only in selected sheets s1, s2, s3 of the stack 81 in step h).

Depending on the material in the work piece 2 it is more or less suitable to vibrate the cutting tool 68. When making holes 34 in a stack of sheets of different materials the vibrating means 77 can be switched on and of depending on which sheet s1, s2, s3 in the stack 81 the cutting tool 68 is situated when making the hole 34.

The method comprises the further step of:
k) collecting data from the working operation into the memory 126.

The data collected from the working operation may for example be cutting length, feed length, spindle speed, feed rate and hole depth.

The method comprises the further steps of:
l) identifying the opening 4, 6, 8, . . . 32);
m) measuring the work piece 2 with respect to the result of the working operation;
n) collecting the measured values into the memory 126.

After the working operation the work piece 2 is measured with respect to the result of the working operation. If the working operation comprises making of holes 34, values are measured and data about hole shape, depth, diameter, countersink characteristics and cylindricity is collected into the memory 126. This collected data may be used to match the hole 34 with a fastening element (not disclosed) with complementary characteristics in relation to the characteristics of the hole 34. If the hole 34 for example is under sized in relation to predetermined characteristics of the hole 34 it may be possible to find a fastening element which may compensate for the deflection of the hole 34.

The method comprises the further step of:
o) bringing additional predetermined working parameters related to the identified bushing 36-64 from the memory 126, such as number of holes 34 to drill, thickness of the work piece 2, cutting length, feed length, spindle speed, feed rate and hole depth before working the work piece 2 in step e).

These predetermined working parameters may be stored into the memory 126 as a recipe for the working process.

The method further comprises that the work tool 70 comprises a controllable vibrating means 77 for vibrating the cutting tool 68 in the longitudinal direction of the cutting tool 68.

Depending on the material in the work piece 2 it is more or less suitable to vibrate the cutting tool 68. When making holes 34 in a stack of sheets of different materials the controllable vibrating means 77 can be switched on and of depending on which sheet s1, s2, s3 in the stack 81 the cutting tool 68 is situated when making the hole 34.

The method comprises the further step of:

p) providing a measuring instrument 74 on the identified bushing 36-64 before step c) and before step m) for measuring and thereby determining the distance a between the fixed point 116 on the identified bushing 36-64 and the surface 118 of the work piece 2 facing the template 1, and for measuring the work piece 2 with respect to the result of the working operation.

The measuring instrument 74 may comprise two different probes 134, 136 which are directed in different directions. When performing the measuring in step c) the probe 134 is preferably directed towards the surface 118 of the work piece 2. When performing the measuring in step m) the probe 136 is preferably directed in a radial direction to the worked hole 34 in the work piece 2. However, it is also possible to provide to different measuring instruments 74, one instrument comprising a probe 134 directed towards the surface 118 of the work piece 2 and another instrument comprising a probe 136 directed in a radial direction to the worked hole 34 in the work piece 2. Preferably, the measuring instrument 74 is connected to a control unit 122, which is run by a computer 128, having a software algorithm adapted for providing calculations about the measuring operation.

The system for measuring and working objects comprises a computer 128 including a computer program P for carrying out the method according to the invention, in which a software algorithm provides said calculations about the measuring operation.

The present invention also relates to a computer programme P and a computer programme product for performing the method steps. The computer programme P comprises a programme code for performing the method steps according to the present invention as mentioned herein, when said computer programme P is run on a computer 128. The computer programme product comprises a program code stored on a, by a computer 128 readable, media for performing the method steps according to the present invention as mentioned herein, when said computer programme P is run on the computer 128. Alternatively, the computer programme product is directly storable in an internal memory into the computer 128, comprising a computer programme P for performing the method steps according to the present invention, when said computer programme P is run on the computer 128.

An aspect of the invention relates to a computer programme P comprising a programme code for performing the steps of:

a) providing a template 1 with at least one opening 4, 6, 8, . . . 32 to the work piece 2;
b) providing a work tool 70 at the opening 4, 6, 8, . . . 32;
c) determining a distance a between a fixed reference 17, 116 for the work tool 70 and a surface 118 of the work piece 2 facing the template 1;
d) collecting the determined distance a into a memory 126,
e) vibrating a rotary cutting tool 68 on the work tool 70 by means of a vibrating means 77; and
f) working the work piece 2 based on said collected distance a.

In the second embodiment the at least one opening 4, 6, 8, . . . 32 comprises a bushing 36-64 and the computer programme P comprising programme code for performing the steps of:

after step a): the further step of g) identifying the bushing 36-64;
performing step c) before step b) and identify a fixed point 116 on the identified bushing 36-64 as the fixed reference for the tool 70;
performing step d) after step c) and before step b);
after step d): the further step of h) identifying the bushing 36-64; and
after step b) and before step e): the further step of i) bringing the determined distance a for the identified bushing 36-64 from the memory 126.

The computer programme P further comprising programme code for performing the steps of:

j) bringing information from the memory 126 regarding material characteristics and thickness of each sheet s1, s2, s3 in the stack 81, and number of sheets s1, s2, s3 in the stack 81 before step e);
k) collecting data from the working operation into the memory 126;
l) identifying the bushing 36-64;
m) measuring the work piece 2 with respect to the result of the working operation;
n) collecting the measured values into the memory 126;
o) bringing additional predetermined working parameters related to the identified bushing 36-64 from the memory 126, such as number of holes 34 to drill, thickness of the work piece 2, cutting length, feed length, spindle speed, feed rate and hole depth before working the work piece 2 in step e); and
p) providing a measuring instrument 74 on the identified bushing 36-64 before step c) and before step m) for measuring and thereby determining the distance a between the fixed point 116 on the identified bushing 36-64 and the surface 118 of the work piece 2 facing the template 1, and for measuring the work piece 2 with respect to the result of the working operation.

The computer program P may for example present information on a display to an operator who performs some or all of the activities in the steps a)-p). Alternatively or in combination, the computer program P may control a robot which performs some or all of the activities in these steps.

An aspect of the invention relates to a computer programme product comprising a program code stored on a, by a computer 128 readable, media for performing steps of:

a) providing a template 1 with at least one opening 4, 6, 8, . . . 32 to the work piece 2;
b) providing a work tool 70 at the opening 4, 6, 8, . . . 32;
c) determining a distance a between a fixed reference 17, 116 for the work tool 70 and a surface 118 of the work piece 2 facing the template 1;
d) collecting the determined distance a into a memory 126,
e) vibrating a rotary cutting tool 68 on the work tool 70 by means of a vibrating means 77; and
f) working the work piece 2 based on said collected distance a.

In the second embodiment the at least one opening 4, 6, 8, . . . 32 comprises a bushing 36-64 and the computer programme product comprising the program code stored on the, by the computer 128 readable, media for performing the further steps of:

after step a): the further step of g) identifying the bushing 36-64; performing step c) before step b) and identify a fixed point 116 on the identified bushing 36-64 as the fixed reference for the tool 70;

performing step d) after step c) and before step b);

after step d): the further step of h) identifying the bushing 36-64; and after step b) and before step e): the further step of i) bringing the determined distance a for the identified bushing 36-64 from the memory 126.

The computer programme product comprising the program code stored on the, by the computer 128 readable, media for performing the further steps of:

j) bringing information from the memory 126 regarding material characteristics and thickness of each sheet s1, s2, s3 in the stack 81, and number of sheets s1, s2, s3 in the stack 81 before step e);

k) collecting data from the working operation into the memory 126;

l) identifying the bushing 36-64;

m) measuring the work piece 2 with respect to the result of the working operation;

n) collecting the measured values into the memory 126;

o) bringing additional predetermined working parameters related to the identified bushing 36-64 from the memory 126, such as number of holes 34 to drill, thickness of the work piece 2, cutting length, feed length, spindle speed, feed rate and hole depth before working the work piece 2 in step e); and p) providing a measuring instrument 74 on the identified bushing 36-64 before step c) and before step m) for measuring and thereby determining the distance a between the fixed point 116 on the identified bushing 36-64 and the surface 118 of the work piece 2 facing the template 1, and for measuring the work piece 2 with respect to the result of the working operation.

An aspect of the invention relates to a computer programme product directly storable in an internal memory M into a computer 128, comprising a computer programme P for performing the steps of:

a) providing a template 1 with at least one opening 4, 6, 8, . . . 32 to the work piece 2;

b) providing a work tool 70 at the opening 4, 6, 8, . . . 32;

c) determining a distance a between a fixed reference 17, 116 for the work tool 70 and a surface 118 of the work piece 2 facing the template 1; d) collecting the determined distance a into a memory 126, e) vibrating a rotary cutting tool 68 on the work tool 70 by means of a vibrating means 77; and f) working the work piece 2 based on said collected distance a.

In the second embodiment the at least one opening 4, 6, 8, . . . 32 comprises a bushing 36-64 and the computer programme product directly storable in the internal memory M into the computer 128, comprising the computer programme P for performing the further steps of:

after step a): the further step of g) identifying the bushing 36-64;

performing step c) before step b) and identify a fixed point 116 on the identified bushing 36-64 as the fixed reference for the tool 70;

performing step d) after step c) and before step b);

after step d): the further step of h) identifying the bushing 36-64; and after step b) and before step e): the further step of i) bringing the determined distance a for the identified bushing 36-64 from the memory 126.

The computer programme product directly storable in the internal memory M into the computer 128, comprising the computer programme P for performing the further steps of:

j) bringing information from the memory 126 regarding material characteristics and thickness of each sheet s1, s2, s3 in the stack 81, and number of sheets s1, s2, s3 in the stack 81 before step e);

k) collecting data from the working operation into the memory 126;

L) identifying the bushing 36-64;

m) measuring the work piece 2 with respect to the result of the working operation;

n) collecting the measured values into the memory 126;

o) bringing additional predetermined working parameters related to the identified bushing 36-64 from the memory 126, such as number of holes 34 to drill, thickness of the work piece 2, cutting length, feed length, spindle speed, feed rate and hole depth before working the work piece 2 in step e); and p) providing a measuring instrument 74 on the identified bushing 36-64 before step c) and before step m) for measuring and thereby determining the distance a between the fixed point 116 on the identified bushing 36-64 and the surface 118 of the work piece 2 facing the template 1, and for measuring the work piece 2 with respect to the result of the working operation.

Features and components of the different embodiments above may be combined within the scope of the invention.

The invention claimed is:

1. A method for working of a work piece, comprising the step of:
    a) providing a template (1) with at least one opening (4, 6, 8, . . . 32) to the work piece (2);
    characterized in that the method further comprises the steps of:
    b) providing a work tool (70) at the opening (4, 6, 8, . . . 32);
    c) determining a distance (a) between a fixed reference (17, 116) for the work tool (70) and a surface (118) of the work piece (2) facing the template (1);
    d) collecting the determined distance (a) into a memory (126);
    e) vibrating a rotary cutting tool (68) on the work tool (70) by means of a vibrating means (77); and
    f) working the work piece (2) based on said collected distance (a).

2. The method according to claim 1, characterized in that the fixed reference (17) for the work tool (70) is situated on a first distal end (75) of the rotary cutting tool (68).

3. The method according to claim 1, characterized in that the determined distance (a) is the difference between the length (1) of the rotary cutting tool (68) and the length (L) of a collet (13) enclosing at least partly the rotary cutting tool (68).

4. The method according to claim 1, characterized in that the at least one opening (4, 6, 8, . . . 32) comprises a bushing (36-64) and after step a): the further step of g) identifying the bushing (36-64);
    performing step c) before step b) and identify a fixed point (116) on the identified bushing (36-64) as the fixed reference for the work tool (70);
    performing step d) after step c) and before step b);
    after step d): the further step of h) identifying the bushing (36-64); and
    after step b) and before step e): the further step of i) bringing the determined distance (a) for the identified bushing (36-64) from the memory (126).

5. The method according to claim 1, characterized in that the work piece (2) is a stack (81) of sheets (s1, s2, s3) of different materials; and before step e) the further step of: j) bringing information from the memory (126) regarding material characteristics and thickness of each sheet (s1, s2, s3) in the stack (81), and number of sheets (s1, s2, s3) in the stack (81).

6. The method according to claim 5, characterized in step e):

vibrating the work tool (70) only in selected sheets (s1, s2, s3) of the stack (81).

7. The method according to claim 1, characterized in the further step of:

k) collecting data from the working operation into the memory (126).

8. The method according to claim 1, characterized in the further steps of:

l) identifying the opening (4, 6, 8, . . . 32);

m) measuring the work piece (2) with respect to the result of the working operation; and n) collecting the measured values into the memory (126).

9. The method according to claim 1, characterized in the further step of:

o) bringing additional predetermined working parameters related to the identified bushing (36-64) from the memory (126) before working the work piece (2) in step e).

10. The method according to claim 1, characterized in that the work tool (70) is connected to a control unit (122).

11. The method according to claim 1, characterized in that the work tool (70) comprises a controllable vibrating means (77) for vibrating the cutting tool (68) in the longitudinal direction of the cutting tool (68).

12. The method according to claim 4, characterized in the further steps of:

l) identifying the opening (4, 6, 8, . . . 32);

m) measuring the work piece (2) with respect to the result of the working operation;

n) collecting the measured values into the memory (126); and p) providing a measuring instrument (74) on the identified bushing (36-64) before step c) and before step m) for measuring and thereby determining the distance (a) between the fixed point (116) on the identified bushing (36-64) and the surface (118) of the work piece (2) facing the template (1), and for measuring the work piece (2) with respect to the result of the working operation.

13. The method according to claim 10, characterized in that the measuring instrument (74) is connected to a control unit (122).

14. The method according to claim 1, characterized in that the opening (4, 6, 8, . . . 32) is identified by means of a RFID tag (82-110) arranged at the opening (4, 6, 8, . . . 32) or on the template (1).

15. The method according to claim 4, characterized in that the fixed point (116) on the identified bushing (36-64) coincides with a surface (120) on the bushing (36-64) facing away from said surface (118) of the work piece (2).

16. The method according to claim 6, characterized in that the control unit (122) is run by a computer (128), having a software algorithm adapted for providing calculations about the measuring and working operation.

17. A system for working and measuring objects comprising a computer (128) including a computer program for carrying out the method according to claim 1, in which a software algorithm provides said calculations.

18. A non-transitory computer-readable medium having a computer programme product comprising a program code stored thereon, that when executed by a computer (128), causes the computer to perform the method of claim 1.

19. A system comprising a computer having a processor and an internal memory, wherein the memory has a computer programme stored thereon, that when executed, causes the processor of the computer to perform the method of claim 1.

20. The method according to claim 9, wherein the additional predetermined working parameters include a number of holes (34) to drill, thickness of the work piece (2), cutting length, feed length, spindle speed, feed rate, or hole depth.

* * * * *